March 22, 1927.  R. C. ALLEN  1,621,618

TURBINE BLADE LASHING

Filed July 24, 1925  2 Sheets-Sheet 1

R.C. Allen
INVENTOR

BY D.C. Davis
ATTORNEY

WITNESSES:

March 22, 1927.   1,621,618

R. C. ALLEN

TURBINE BLADE LASHING

Filed July 24, 1925   2 Sheets-Sheet 2

WITNESSES:

R.C. Allen
INVENTOR

BY

ATTORNEY

Patented Mar. 22, 1927.

1,621,618

UNITED STATES PATENT OFFICE.

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA.

TURBINE-BLADE LASHING.

Application filed July 24, 1925. Serial No. 45,788.

My invention relates to elastic fluid turbines, more particularly to means for lashing the blades thereof, and has for its object the provision of a simple, efficient lashing means which shall be effective to minimize vibration stresses in the blades.

Figure 1:
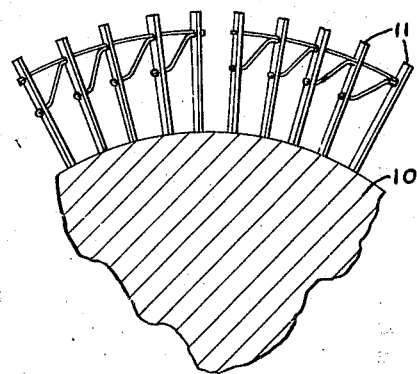
Figure 2:
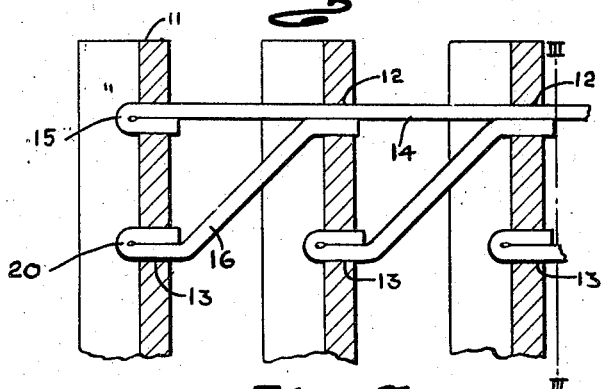
Figure 3:
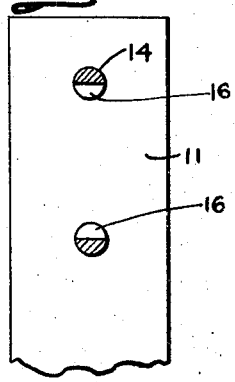

Apparatus embodying features of my invention is illustrated in the accompanying drawing, forming a part of this specification, in which Fig. 1 is a fragmentary view of a turbine rotor having a plurality of blades mounted thereon and provided with lashing made in accordance with my invention applied thereto; Fig. 2 is an enlarged sectional view of three blades lashed in accordance with my invention; Fig. 3 is a sectional view taken along the line III—III of Fig. 2; and Figs. 4, 5, 6 and 7 are sectional views illustrating modifications of my invention.

As is well-known in the turbine art, lashing is applied to the blades of turbines in order to minimize the vibration thereof. It is also well-known that the beneficial effect secured from turbine lashing is by reason of the increased rigidity of the blading structure provided by the lashing which, in turn, raises the natural frequency of vibration of the blading structure. In order to secure the desired rigidity of the blading structure, it is customary to rigidly fix the lashing wire in the lashing hole by soldering or otherwise. The increase in rigidity secured thereby depends upon the rigidity of the lashing wires between the blades. While a lashing wire of a relatively large diameter would of course raise the natural frequency of blade vibration to above that necessary to prevent blade breakage from vibration, the holes required for the insertion of such a lashing in the blade would so weaken it as to make it objectionable and at the same time such a lashing wire would offer considerable resistance to the motive fluid flow.

In accordance with my invention I provide a lashing which has all the benefits of a relatively large lashing wire and at the same time presents a relatively small resistance to the motive fluid flow. I accomplish this by extending a relatively small lashing wire through a series of blades in a row and provide diagonal bracing extending from the first-mentioned lashing to an adjacent blade.

Referring now to the drawing for a better understanding of my invention, I show in Fig. 1 at 10 a fragment of a turbine rotor having a series of moving blades 11—11 mounted thereon. Provided in the blades 11—11 is an outer series of holes 12—12 and an inner series of holes 13—13 (Fig. 2). With relatively long blades, more than two series of holes might be applied if necessary. Extending through the outer series of holes 12—12 is a lashing member 14. The lashing member 14, as may be seen from Fig. 3, is preferably of half-round section and is bent back upon itself, as at 15, after passing through a desired number of blades, so as to completely fill the hole 12 at the end of a segment. In each of the inner series of holes 13—13 except the last inner hole of a segment, is inserted a half-round lashing member 16 which is also bent back upon itself, as at 20, to completely fill the hole 13. The lashing member 16 extends diagonally to the hole 12 of an adjacent blade and in cooperation with the lashing wire 14 serves to completely fill the hole 12 in which it is inserted.

Figure 4:
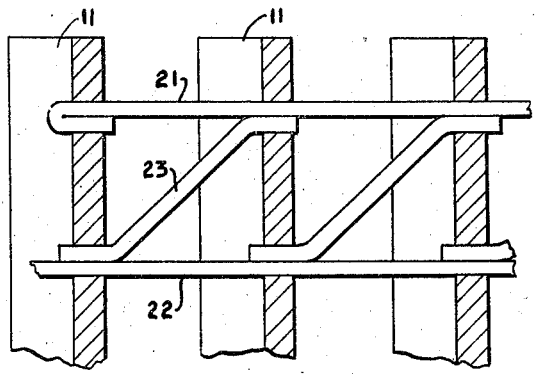

In Fig. 4 I show a modification of my invention adapted to give greater strength to the blading structure than that shown in Figs. 1, 2 and 3. In accordance with this modification two continuous lashing members 21 and 22 are applied to the blades and diagonally extending lashing members 23 are interposed between adjacent blades of a row in a manner similar to the lashing members 16 shown in Fig. 2.

Figure 5:
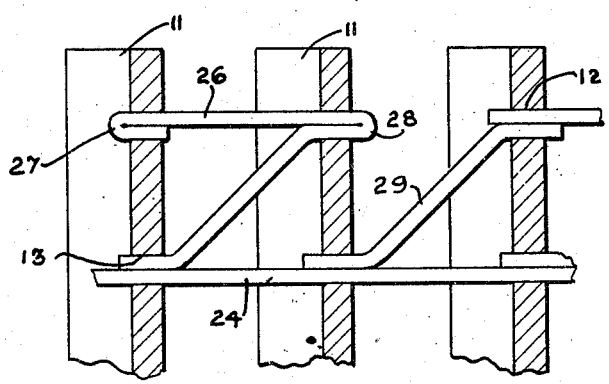
Figure 7:
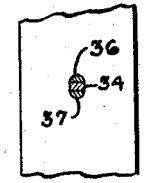
Figure 6:
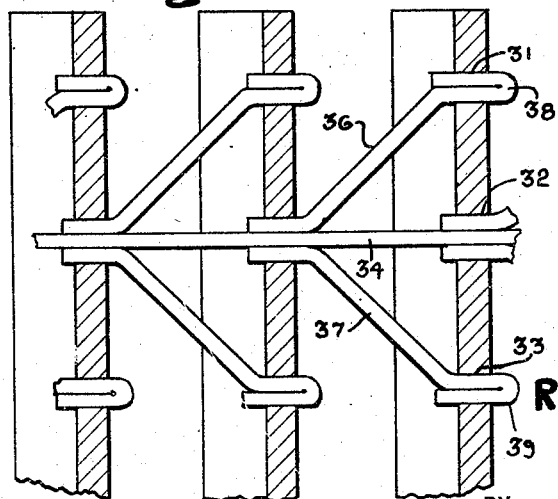

In Fig. 5 I show a further modification in which a continuous lashing member 24 is applied along an inner series of aligned holes of a blade row and reinforcing lashings 26 are applied to blades in pairs along an outer series of aligned holes. The members 26 may be bent backward to fill the holes at 27 and 28 and extend diagonally downward to the inner series of holes at 13, cooperating with the inner lashing member 24 to fill said holes. In addition to the outer members 26, a diagonally extending lashing member 29 may be applied between pairs of blades and extend from the inner series of holes 13 to the outer series 12 as shown. In accordance with the modification of my invention shown in Fig. 6, I provide three series of aligned holes 31, 32 and 33. Along the intermediate series of holes 32 a continuous lashing member 34 is applied. Extending diagonally from the intermediate series of holes are two lashing members 36 and 37 which are inserted in the outer series of holes 31 and 33 and bent backward to fill said holes at 38 and 39. The holes 32, of course, are made of sufficient size to accommodate the three lashing members and of such shape as to conform to their added contours. Thus the member 34 may be square in cross section and the members 36 and 37 semicircular in cross section, all of said members cooperating as shown in Fig. 7.

In assembling the apparatus, the lashing wires are inserted in the manner set forth and are preferably secured to the blades by soldering or brazing. The resulting structure is one of great rigidity and one which effectively minimizes vibration of the blades.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. Means for lashing a row of turbine blades comprising a lashing member extending along the row and secured to each blade, and other lashing members extending diagonally between adjacent blades in a row and secured to said blades, all of said lashing members lying in a plane normal to the axis of the turbine rotor.

2. Means for lashing a row of turbine blades comprising a lashing member extending along the row and secured to each blade, and a diagonally extending lashing member secured at one end to a blade and the first lashing member and at the other end to an adjacent blade in a row.

3. In a turbine, a segment of blades, at least two series of aligned holes provided in the blades, a lashing wire extending through one series of aligned holes, and other lashing wires extending diagonally from the other series of holes to the first-mentioned series between adjacent blades in a row.

4. In a turbine, a row of blades having an inner and an outer row of holes provided therein, a lashing wire having a cross-sectional area aproximately half that of one hole extending through the outer row of holes in a segment of blades and bent backward to fill the hole at one end of the segment, relatively short lashing members extending between adjacent blades of the segment and having one end inserted in the outer hole of a blade and filling said hole in cooperation with the first-mentioned lashing member, and having the other end inserted in the inner hole of an adjacent blade and bent backward to completely fill said hole.

5. In a turbine, a row of blades having a plurality of series of aligned holes provided therein, a lashing member extending through one series of holes and having a cross sectional area sufficient to only partially fill said holes, other lashing members cooperating with the first mentioned lashing member to completely fill the holes and extending diagonally between adjacent blades to another series of holes where they are secured to the blades.

6. Means for lashing a row of turbine blades comprising a lashing member extending along the row and secured to each blade, and other lashing members extending between adjacent blades in a row and each secured to one blade adjacent to the first-mentioned lashing member and to another blade at a point spaced from the first-mentioned lashing member.

7. Means for lashing adjacent turbine blades comprising two lashing members secured to one of the adjacent blades at spaced points and to the other blade adjacent each other.

8. Means for lashing a series of turbine blades between the roots and the tips thereof, comprising two lashing members disposed between and fixedly secured to adjacent blades in said series, the points of securement of said lashing members to one of said adjacent blades being spaced from each other and from the ends of said blade and one of said lashing members being disposed, in a plane longitudinally of the blades, diagonally with respect to the other.

9. Means for lashing a series of turbine blades in a row comprising two lashing members disposed between and fixedly secured to adjacent blades in said series, one of said lashing members being secured to one of said blades at a point substantially further from the free end of said blade than the point of securement of the other lashing member to said blade, and being secured to the second of said adjacent blades at a point at least as near to the free end of said second blade as the point of securement of the other lashing member to said second blade.

In testimony whereof, I have hereunto subscribed my name this twenty-first day of July, 1925.

ROBERT C. ALLEN.